Patented May 6, 1941

2,240,939

UNITED STATES PATENT OFFICE 2,240,939

BINDING AGENT FOR LINOLEUM

Abraham B. Miller, Newark, Del., assignor to Hercules Powder Company, Wilmington, Del., a corporation of Delaware No Drawing. Application August 27, 1938, Serial No. 227,058

14 Claims. (Cl. 260—18)

This invention relates to an oleoresinous composition adapted for use as a binding agent for linoleum and to a method for the manufacture thereof.

In the manufacture of floor coverings of the linoleum type it has generally been the practice to employ an oxidized drying oil-rosin composition as a binder for the other ingredients. While such floor coverings are reasonably satisfactory, they have certain inherent disadvantages. For example, the alkalies, found in many soaps and cleansing powders, attack these binding agents and thus soften the linoleum, resulting in a breakdown of the wearing surface and consequent uselessness in a relatively short time. Apart from the action of alkalies, such floor coverings are inclined to be too soft to withstand heavy weights especially under sub-tropical and tropical conditions.

The present invention has for an object a binding agent which will produce a floor covering with an improved resistance to weak alkalies and moisture, making possible a floor covering having increased life in service.

In accordance with my invention, my binding agent comprises the reaction product of petroleum hydrocarbon-insoluble resin derived from pine wood, a drying oil or a semi-drying oil and a converting agent, specifically, an aldehyde with or without an alkaline catalyst. The drying or semi-drying oils modified in this manner yield an elastic gel product which is an improvement over the prior art oxidized plastics or binding agents for linoleum, in that it has an improved resistance to moist, warm conditions and alkalies. Furthermore, it is possible to use high concentrations of fish oils in the preparation of my linoleum plastics without deleterious results. The prior art has attempted to use fish oils, such as, for example, Menhaden oil, in the preparation of binding agents but the use of any appreciable quantities of these oils has increased rather than decreased the deficiencies of the binding agents. In addition, prior art binding agents with appreciable quantities of fish oils have produced linoleum mixes having poor fabricating qualities. My binding agents may be mixed with ground cork, wood flour and other fillers to form a surfacing material on burlap in the fabrication of inlaid, granulated or plain linoleums, or to form a surfacing material on saturated felt to fabricate a linoleum-like floor covering.

In proceeding to make my binding agent, subsequently to be used in linoleum compounding, I heat petroleum hydrocarbon-insoluble resin derived from pine wood with a drying or semi-drying oil at a temperature from about 570° F. to about 590° F. for about ½ hour to effect preliminary combination. I then lower the temperature to about 525° F. and hold at that temperature for approximately 4–5 hours. At the end of this time the material will be of a heavy, sticky pitch-like consistency, and the addition of a minor amount of an aldehyde with or without an alkaline catalyst converts this pitch-like material to one having an elastic gel structure, which is the binding agent used for linoleum compounding.

With regard to the converting agent, it is desirable to take the precaution of not adding this before the oleoresinous composition has reached a stage of polymerization such that the said composition assumes an elastic gel structure after the converting agent is added thereto. I have found, for example, that if this is added at the end of 3 hours, no action except a slight thickening occurs. The point to add the agent is conveniently determined by withdrawing a small sample, adding the converting agent thereto, maintaining this at about 400° F. to about 525° F. and determining whether this small sample will gel. If it does, said agent in proper amount may be added to the larger batch.

The binder, as prepared above, may be used alone or it may be blended with the orthodox linoleum binder heretofore used. If blended with the latter, the preferable resin concentration of my plastic will be within the range of about 10% to about 40% by weight, the balance being oil. If, on the other hand, my binder is used alone, I prefer that the resin concentration thereof be not substantially in excess of about 33% by weight. For special purposes, however, such as in the preparation of tile-type linoleum, the resin concentration in my binder may be as high as about 40%.

The resin which I use in preparing my binder and designate herein as petroleum hydrocarbon-insoluble resin derived from pine wood, may be prepared by extracting pine wood with a coal tar hydrocarbon such as, benzol or toluol, then evaporating the volatile constituents leaving a residue consisting of a mixture of wood rosin and the resin used in the present invention. Extraction of this mixture with a petroleum hydrocarbon such as, for example, gasoline, dissolves the rosin and after separation of the rosin, high in abietic acid, a resinous residue low in abietic acid remains. This resin is characterized by substantial insolubility in cold petroleum hydrocarbons, but will differ somewhat in its specific characteristics, such as acid number, melting point, exact petroleum ether solubility and content of naphtha and toluol soluble matter, depending upon the method for the recovery of rosin from pine wood used in its production. This resin is more fully described and claimed in the copending application, Serial No. 61,745, filed on January 31, 1936, by Lucius C. Hall, now Patent No. 2,193,026.

Among the drying oils which may be used in the preparation of my improved binder are linseed oil, perilla oil, hempseed oil and others.

Among the semi-drying oils I may use either those of vegetable or marine origin, such as, for example, soya bean oil, corn oil, Menhaden oil, etc.

Both types of oils may be used in the raw state or they may first be bodied by heating.

The product obtained by heating the oil and resin together as described before, is a sticky, pitch-like product. To convert this to the gel product, suitable as a binder for linoleum, I add an aldehyde with or without an alkaline catalyst to the hot oleoresinous product after it has reached the stage of polymerization before indicated. The alkaline catalyst may be used per se with the aldehyde or it may be combined in the same molecule with the aldehyde. Among the aldehydes suitable in accordance with this invention are para-formaldehyde, acetaldehyde, furfural, etc. The converting agent which I prefer to use, and with which I obtain the best results, is hexamethylenetetramine. In this unique compound the aldehyde and alkaline catalyst are molecularly combined, and at the relatively high temperatures used in the present invention, some ammonia is liberated. It is to be understood, therefore, that where I refer to an aldehyde with an alkaline catalyst in the claims, I mean that the said catalyst may be molecularly combined with the aldehyde or it may merely be in admixture with the aldehyde.

With the drying oils conversion is obtained with the aldehydes alone but in order to make the reaction product using a semi-drying oil equivalent to that produced with a drying oil, it is necessary that an alkaline catalyst, for example, lime, sodium carbonate, zinc oxide, etc. be used in conjunction with the aldehyde or that the alkaline catalyst be combined in the same molecule with the aldehyde, as in hexamethylenetetramine. The alkaline catalysts, combined or uncombined, may of course also be used with the drying oils, the same conversion occurring in less time than with the aldehydes alone.

The amount of converting agent used varies with the converting agent. When using hexamethylenetetramine, I prefer about 1% to about 3% of the weight of the oleoresinous composition, and with an aldehyde alone I prefer using about the same amount. With an aldehyde and added alkaline catalyst, I prefer using about 2% to about 3% of the aldehyde and about 2% to about 3% of the alkaline catalyst.

Having described my invention in a general manner, I will now proceed to a more detailed description thereof by reference to the following examples.

Example I

Thirty-three parts by weight of petroleum hydrocarbon-insoluble resin derived from pine wood and sixty-seven parts by weight of a Menhaden oil bodied at about 575° F. to a viscosity of S (Gardner-Holdt Scale) were heated together at about 575° F. for ½ hour to effect preliminary combination, and were then held at a temperature of about 525° F. for about 5 hours and this hot mixture was then converted by the addition of 1% of hexamethylenetetramine to produce my binding agent, having an elastic gel structure. This plastic or binding agent was then compounded with other ingredients to form a linoleum having the properties more fully described below. The linoleum made with this binder is designated as linoleum A in Table 1.

Example II

Thirty-three parts by weight of petroleum hydrocarbon-insoluble resin derived from pine wood and 67.0 parts by weight of bodied soya bean oil were heated together and converted as shown in Example I. The linoleum made with this binder is designated as linoleum B in Table 1.

Example III

Thirty-three parts by weight of petroleum hydrocarbon-insoluble resin derived from pine wood, 60.3 parts by weight of bodied Menhaden oil and 6.7 parts by weight of raw castor oil were heated together and converted as shown in Example I. The linoleum made with this binder is designated as linoleum C in Table 1.

Example IV

Thirty-three parts by weight of petroleum hydrocarbon-insoluble resin derived from pine wood, 33.5 parts by weight of bodied Menhaden oil and 33.5 parts by weight of bodied soya bean oil were heated together and then converted as in Example I. The linoleum made with this binder is designated as linoleum D in Table 1.

Example V

Thirty parts by weight of petroleum hydrocarbon-insoluble resin derived from pine wood and 70.0 parts by weight of bodied Menhaden oil were heated together and then converted as in Example I. The linoleum made with this binder is designated as linoleum E in Table 1.

A white inlaid linoleum of the following formulation was made using each of the plastics or binding agents above shown. The same formula was also made using a regular linoleum binding agent, this to be used as a comparator for the series. Formula 1 is as follows:

| | Parts by weight |
|---|---|
| Binding agent | 90 |
| Wood flour | 80 |
| Whiting | 100 |
| Titanium oxide | 17 |
| Ultramarine blue | 0.5 |

Each linoleum mix was prepared in the manner well known in the art and then sheeted to give a thickness of 0.12–0.16″ gage. Each sheet was then matured at 180° F. until it passed the U. S. specifications for battleship linoleum. These specifications require the application of an 80 pound load, on a flat circular plunger 0.282 inch in diameter, to the surface of the linoleum for one minute. This weight is removed and the surface gaged immediately and again after 1 hour. To meet the specifications, the surface must not be broken and the indentation measured immediately after removal of the load must not exceed 0.006 inch, nor the indentation measured 1 hour thereafter exceed 0.001 inch.

Each of the sheets containing the binding agents prepared as shown in Examples I to V was then subjected to an alkali resistance test and a softening test. The former was determined by putting an iron ring of 1 inch inside diameter on the surface of the linoleum with paraffin and then placing in the center a 5% aqueous solution of sodium hydroxide for 20 minutes. The solution was removed at the end of this time, the sample blotted dry and the linoleum attacked, scraped away by rubbing gently with a knife. The portion of the linoleum unattacked by the alkali is practically untouched by this gentle scraping. The depth of attack is determined by taking the gage of the sample in the center of the spot and subtracting this from the average gage of the original linoleum.

The softening test is determined by taking strips of the linoleum and obtaining the average indentation of these produced by a load of 2500 grams on a flat circular plunger, 0.282 inch in diameter. These strips are then put on racks in an oven maintained at 180° F., and at 100% relative humidity, and kept there for one week. The strips are removed, blotted dry and 5 minutes thereafter again subjected to the indentation measurement. A similar measurement is also obtained at the end of 1 hour. The degree of softening is, of course, shown by the increase in the indentation.

The results of these tests on the various linoleums made according to Formula 1, containing the binding agents as made in accordance with this invention as well as an orthodox binder, are shown in Table 1.

*Table 1*

| Binder as made in— | Linoleum | Average depth of alkali penetration in inches | Average indentation in 0.01 mm. | | |
|---|---|---|---|---|---|
| | | | Original | 5 minutes after removal from softening test | 1 hour after removal from softening test |
| Orthodox binder. | Control | 0.0085 | 9.0 | *36.0 | *34.5 |
| Ex. 1 | A | 0.0017 | 4.0 | 11.5 | 9.5 |
| Ex. 2 | B | 0.0022 | 7.5 | 11.5 | 10.5 |
| Ex. 3 | C | 0.0038 | 5.0 | 9.5 | 6.0 |
| Ex. 4 | D | 0.0020 | 9.5 | 9.5 | 8.0 |
| Ex. 5 | E | 0.0045 | 7.5 | 9.0 | 7.5 |

*Showed bad blistering.

It will be noted that both in the alkali test and the softening test, the control sample in which an orthodox binder is used is definitely inferior to any of my binders. In the softening test it will be noted that the linoleum containing my binders suffered little or no softening, whereas the control not only showed considerable softening but bad blistering as well. The marked superiority of linoleum made with my binding agents is thus clearly indicated.

The following examples further illustrate binding agents made in accordance with my invention and which are suitable in linoleum fabrication.

*Example VI*

A binding agent was made in the manner indicated in Example I using as the converting agent 4% of the oleoresinous composition of a mixture of equal parts by weight of lime and paraformaldehyde. A linoleum prepared therewith, in the manner before indicated, showed good alkaline resistance and resistance to warm moist conditions.

*Example VII*

A binding agent was made in the manner indicated in Example I using as the converting agent 4% of the oleoresinous composition of a mixture of equal parts by weight of lime and furfural. A linoleum prepared therewith, in the manner before indicated, was very resistant to alkalies and to failure under warm, moist conditions.

As further illustration of the superior products that may be made with my binding agents, additional modifications were made in my improved binders and these were then incorporated in a linoleum mix as shown below and an inlaid linoleum prepared in the same manner as indicated above. Binding agents were made in accordance with the general procedure shown in Example I using (1) a heat bodied Menhaden oil, the procedure being as shown in Example 1; (2) a heat bodied Menhaden oil but air blowing during the cooking of the resin and oil as shown in Example I; (3) raw Menhaden oil, air blowing during the cooking of the resin and oil in accordance with the procedure in Example I. The binders so made are designated respectively as binders 10, 11 and 12 and the linoleum made therewith, according to Formula 2 below, are designated respectively as linoleums F, G and H.

A linoleum was also prepared in which the binding agent consisted of 25% of binder 10 and 75% of orthodox binder, designated as binder 13 and the linoleum made therewith, according to Formula 2, as linoleum I. Linoleum J was also prepared according to Formula 2 in which the binding agent, designated as binder 14, was composed of 25% of binder 11 and 75% of orthodox binder.

Formula 2 used for the preparation of linoleums F to J, inclusive, is as follows:

| | Parts by weight |
|---|---|
| Binding agent | 100 |
| Wood flour | 80 |
| Whiting | 100 |
| Titanium oxide | 17 |
| Ultramarine blue | 0.5 |

It will be noted that this formulation is essentially the same as the one used for the preparation of linoleums A to E except that a higher amount of binding agent is used. After the sheeting of each mix, the linoleum was cured as before to meet the specifications for battleship linoleum, and subjected to the tests before described, the results of which are shown in Table 2.

*Table 2*

| Binder | Linoleum | Average depth of alkali penetration in inches | Average indentation in 0.01 mm. | | |
|---|---|---|---|---|---|
| | | | Original | 5 minutes after removal from test | 1 hour after removal from test |
| Orthodox | Control | 0.0082 | 7.0 | 23.5 | 16.0 |
| 10 | F | 0.0035 | 4.5 | 6.5 | 5.5 |
| 11 | G | 0.0035 | | | |
| 12 | H | 0.0050 | 9.0 | 10.5 | 8.5 |
| 13 | I | 0.0060 | 8.0 | 15.5 | 11.5 |
| 14 | J | 0.0060 | 7.0 | 14.5 | 11.5 |

The marked superiority of a linoleum containing my binders is again apparent. It will also be noted that the substitution of 25% of an orthodox binder with one of my binders, produces a pronounced improvement in the properties of the linoleum made therewith, indicating again the remarkable alkali resistance and resistance to warm, moist conditions obtained through the use of my binders.

It will be understood that the examples above shown are by way of illustration only and that the scope of my invention is not to be limited thereto.

What I claim and desire to protect by Letters Patent is:

1. The method of making a linoleum binding agent which comprises heating a mixture of a petroleum hydrocarbon-insoluble resin derived from pine wood and an oil selected from the class consisting of drying and semi-drying oils at a temperature between about 525° and about 590° F. until the composition attains a heavy sticky pitch-like consistency, and thereafter heating said composition with a small proportion of an aldehyde and an inorganic alkaline catalyst until it assumes an elastic gel structure.

2. The method of making a linoleum binding agent which comprises heating a mixture of a petroleum hydrocarbon-insoluble resin derived from pine wood and a drying oil at a temperature between about 525° and about 590° F. until the composition attains a heavy sticky pitch-like consistency, and thereafter heating said composition with a small proportion of an aldehyde and an inorganic alkaline catalyst until it assumes an elastic gel structure.

3. The method of making a linoleum binding agent which comprises heating a mixture of a petroleum hydrocarbon-insoluble resin derived from pine wood and a semi-drying at a temperature between about 525° and about 590° F. until the composition attains a heavy sticky pitch-like consistency, and thereafter heating said composition with a small proportion of an aldehyde and an inorganic alkaline catalyst until it assumes an elastic gel structure.

4. The method of making a linoleum binding agent which comprises heating a mixture of a petroleum hydrocarbon-insoluble resin derived from pine wood and Menhaden oil at a temperature between about 525° and about 590° F. until the composition attains a heavy sticky pitch-like consistency, and thereafter heating said composition with a small proportion of an aldehyde and an inorganic alkaline catalyst until it assumes an elastic gel structure.

5. The method of making a linoleum binding agent which comprises heating a mixture of a petroleum hydrocarbon-insoluble resin derived from pine wood and an oil selected from the class consisting of drying and semi-drying oils at a temperature between about 525° and about 590° F. until the composition attains a heavy sticky pitch-like consistency, and thereafter heating said composition with a small proportion of hexamethylenetetramine.

6. The method of making a linoleum binding agent which comprises heating a mixture of a petroleum hydrocarbon-insoluble resin derived from pine wood and Menhaden oil at a temperature between about 525° and about 575° F. for from about 4 to about 5 hours, and thereafter heating the resultant product with a small proportion of hexamethylenetetramine until it assumes an elastic gel structure.

7. The method of making a linoleum binding agent which comprises heating a mixture of a petroleum hydrocarbon-insoluble resin derived from pine wood and linseed oil at a temperature between about 525° and about 575° F. for from about 4 to about 5 hours, and thereafter heating the resultant product with a small proportion of hexamethylenetetramine until it assumes an elastic gel structure.

8. A binding agent for linoleum prepared by the method defined by claim 1.

9. A binding agent for linoleum prepared by the method defined by claim 2.

10. A binding agent for linoleum prepared by the method defined by claim 3.

11. A binding agent for linoleum prepared by the method defined by claim 4.

12. A binding agent for linoleum prepared by the method defined by claim 5.

13. A binding agent for linoleum prepared by the method defined by claim 6.

14. A binding agent for linoleum prepared by the method defined by claim 7.

ABRAHAM B. MILLER.